Jan. 25, 1966   H. HOFMANN   3,230,940
PISTON ENGINE

Filed April 1, 1964   3 Sheets-Sheet 1

Inventor:
HANS HOFMANN
By K.A. Mayr
ATTORNEY

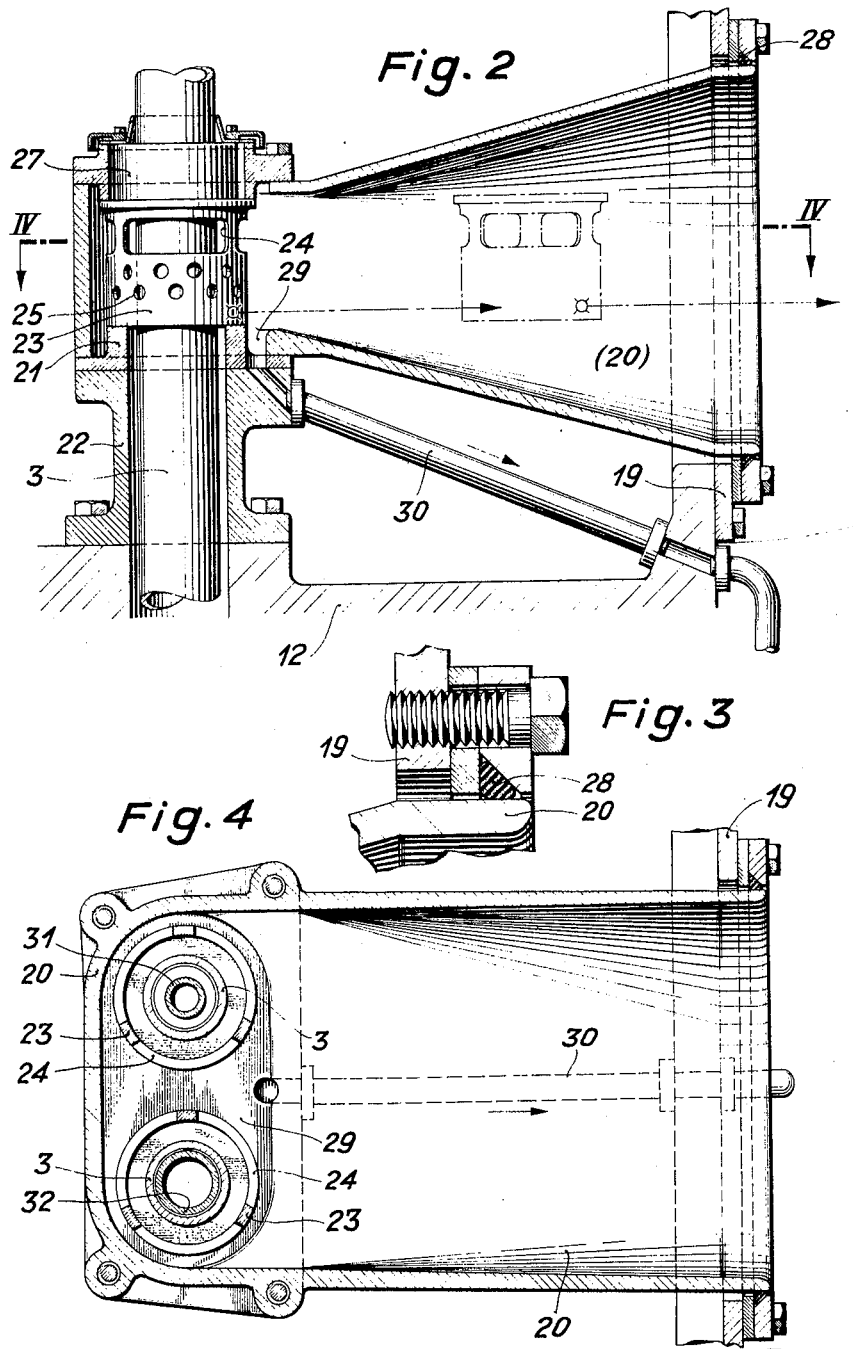

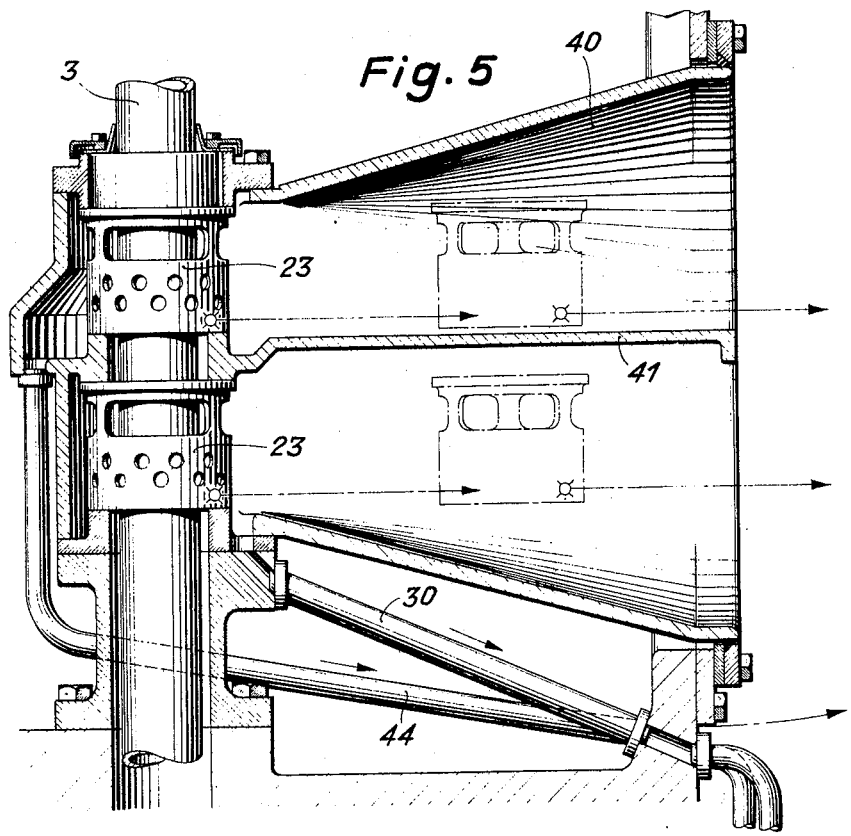
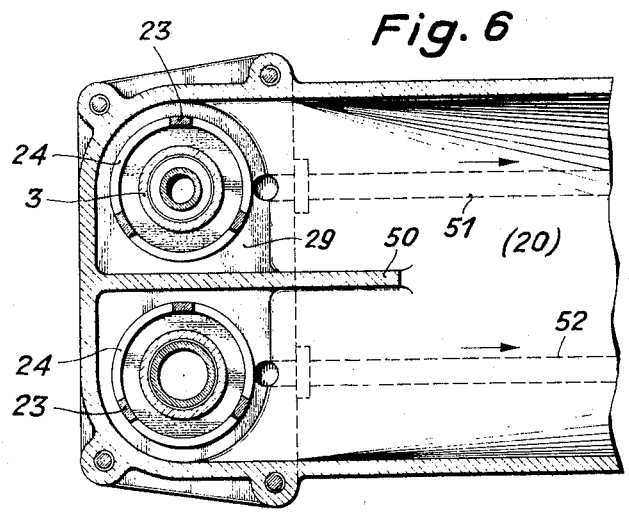

United States Patent Office 3,230,940
Patented Jan. 25, 1966

3,230,940
PISTON ENGINE
Hans Hofmann, Wiesendangen, Switzerland, assignor to Sulzer Brothers Limited, Winterthur, Switzerland, a corporation of Switzerland
Filed Apr. 1, 1964, Ser. No. 356,489
Claims priority, application Switzerland, Apr. 17, 1963, 4,773/63
10 Claims. (Cl. 123—41.36)

The invention relates to a piston engine, more particularly an internal combustion piston engine, the piston having a cavity and being cooled by means of a liquid coolant flowing through at least one tube which is secured to the piston parallel with the axis thereof and which extends through a packing secured to the housing of the engine.

In reciprocating internal combustion engines there are difficulties in sealing the cooling tubes secured to the piston and in scraping operating medium, such as oil or cooling water, off the tubes, because due to the clearance between the piston and the cylinder wall the piston and the tube connected thereto move laterally when the piston reciprocates. This makes it difficult to provide satisfactorily operating packings on the coolant-conducting tubes. The packings must therefore be easily accessible and readily replaceable and, more particularly, must be so arranged that they can be conveniently inspected during operation.

To this end, according to the invention, at least part of the packing or packings is placed in a cavity formed by a casing which extends into the housing of the engine and is sealed off from the engine housing. The casing has an opening outside of the engine housing and the packing or packings is or are accessible through said opening and said cavity without opening or dismantling any part of the engine housing.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 2 is a part-sectional large scale view of a part of the engine shown in FIG. 1.

FIG. 3 is a large scale sectional view of a portion of the part shown in FIG. 2.

FIG. 4 is a longitudinal sectional view of the part shown in FIG. 2, the section being made along line IV—IV of FIG. 2.

FIG. 5 is a part-sectional view of a modified part of the engine shown in FIG. 1.

FIG. 6 is a longitudinal sectional view of a modification of the part shown in FIG. 5.

Figure 1:
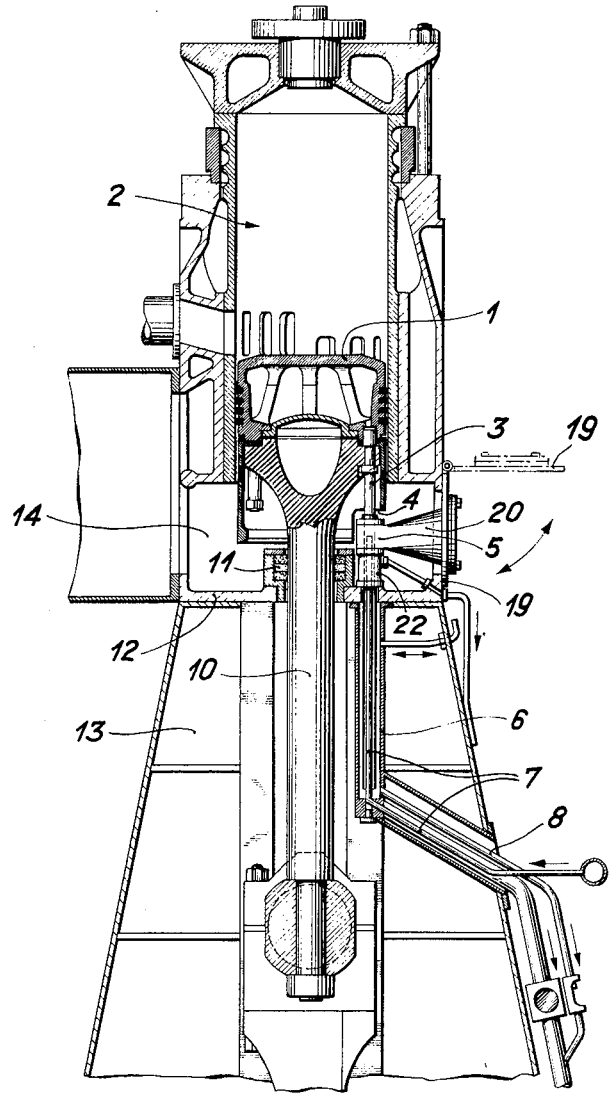
FIG. 1 is a vertical sectional view of a reciprocating internal combustion engine according to the invention.

Referring more particularly to FIG. 1 of the drawing, numeral 1 designates a piston of a two-stroke internal combustion engine 2. The piston 1 is hollow and tubes 3 are connected thereto to move therewith for supplying and removing a liquid coolant, for example, water. The tubes 3 extend through packings 5 mounted on the housing of the engine, and extend into a chamber 6 to which pipes 7 and 8 are connected for supplying coolant by injecting the coolant into the tubes 3 and for removing the coolant. The lower part of the skirt of the piston 1 is provided with a recess 4 for accommodating the packing 5. The piston engine shown is of the type wherein a piston rod 10 extends through a packing 11 in a wall 12 separating a crank chamber 13 from an air chamber 14 which is located below the engine cylinder. The air chamber 14 receives air of superatmospheric pressure for scavenging and charging the cylinder.

The packings 5 are placed in a casing 20 which is shown in section on an enlarged scale in FIG. 2. The casing 20 is connected to the wall 12 by means of elements 21 and 22. Two bushings 23 are located in the casing 20 and a plurality of packing rings individually surrounding the tubes 3 are placed in the conventional manner in the bushings 23. The packing rings separate the interior of the casing 20 from the chamber 6 and wipe off water adhering to the tubes 3 during the upward stroke and wipe off oil during the downward stroke. The bushings 23 are provided with peepholes 24 and with the bores 25 for releasing the liquid wiped from the tubes 3.

The casing 20 is inserted in the casing of the engine through an aperture which can be closed by a cover 19. A rubber gasket 28, shown in FIG. 2 and on an enlarged scale in FIG. 3, is placed between the cover 19 and the casing 20. To simplify manufacture the portion of the casing 20 extending through the cover 19 and the aperture in the latter are preferably circular and the gasket 28 is annular.

As seen in FIG. 4, two tubes 3 extend through the casing 20, one tube serving for supplying coolant to the engine and the other tube serving for releasing the coolant. Coolant is preferably supplied in the conventional manner into one of the tubes 3 by injection, an injection pipe 31 being placed in the chamber 6 for this purpose. Release of coolant from the other tube 3 is effected by a standpipe 32 which is also placed in the chamber 6. A recess or ditch 29 is provided around the bushings 23 for collecting liquid coolant and removing it from the casing 20 through a drain-pipe 30.

The packings mounted in the casing 20 which has a flared portion whose large end is open can be observed and serviced at any time. Because of the provision of the peepholes 24 the surfaces of the tubes 3 are always visible and the sealing and wiping effect of the packings can be checked, and it can be ascertained whether water from the chamber 6 or oil which has escaped from the engine cylinder into the air chamber 14 adheres to the tubes 3. Adherence of such liquid to the tubes indicates leakage either through the packing placed in the bushing 23 or through the cuff 26. Since the surfaces of the tubes 3 can be observed at any time through the peepholes 24, suitable measures can be taken in good time if there is damage or wear of the tube surfaces.

The operating liquid adhering to the tubes 3 may be water or oil, which is wiped off by the packing rings placed inside the bushings 23, is collected in the recess 29, and drained away through the pipe 30.

The difference between the embodiment of the invention shown in FIG. 5 and the embodiment shown in FIGS. 2 to 4 resides in the provision of a horizontal separating wall 41 in a casing 40 corresponding to the casing 20 in FIGS. 1 to 4. Bushings 23, each provided with packing or wiping rings, are placed on both sides of the separating wall 41. The chamber formed above the wall 41 is provided with a drainpipe 44 for removing wiped-off operatnig liquid. In the embodiment shown in FIG. 5 the oil wiped from the tubes 3 is removed through the pipe 44 separately from the water adhering to the tubes 3 which is removed from the chamber below the wall 41 through a pipe 30. Since the water is not mixed with oil it can be re-used for cooling.

In the arrangement shown in FIG. 6 a vertical separating wall 50 is placed between the tubes 3 and the bushings 23 surrounding the tubes. The wall 50 divides the recess 29 into two separate parts. Each part is provided with a separate drainpipe 51 and 52. The embodiment shown in FIG. 6 makes it possible to separately collect the operating liquid wiped off the individual tubes 3 so that the amount of liquid wiped off the individual tubes can be measured. The amount of liquid wiped off per time unit is an indication of the condition of the packings and of the surfaces of the individual tubes 3. The recess 29 for receiving the wiped-off operating liquid shown in FIG. 4 may be similarly divided and separate drainpipes may be provided for checking the conditions of the individual pipes and packings.

The interior dimensions of the casings 20 (FIGS. 1 to 4) and 40 (FIG. 5) are preferably such that the bushings 23 together with the packing rings can be pushed through and out of the casings, as indicated by dash-dot lines and arrows in FIGURES 2 and 5, after the tubes 3 have been pulled through the packings. In this way it is possible to remove and overhaul the bushings and packing rings when the engine piston has been removed for regular inspection. It is of advantage to arrange the lowest portion and the drain of the recess 29 at a lower level than the lower surface of the bushing 23. If this is done, wiped-off operating liquid cannot return to the tubes 3 even if the lower horizontal surface of the bushing is damaged.

I claim:

1. In an internal combustion piston engine having a hollow piston and at least one tube connected thereto in parallel relation with the axis of the piston for supplying a liquid coolant to the piston and removing the liquid coolant from the piston:
  a housing for the engine,
  a packing mounted in said housing and axially slidably receiving said tube, and
  a casing extending into said housing and at least partly surrounding said packing, said casing having an opening outside of said housing for providing access to said packing.

2. In an internal combustion piston engine as defined in claim 1 and wherein said casing forms a cavity separated from the interior of said housing and containing at least part of said packing.

3. In an internal combustion piston engine as defined in claim 1 and wherein said packing and said casing comprise means for making a portion of said tube visible and accessible from the outside.

4. In an internal combustion piston engine having a hollow piston and at least one tube connected thereto parallel with the longitudinal axis of the piston for supplying a liquid coolant to the piston and removing the coolant from the piston:
  a housing for the engine, said housing having an exterior wall, said tube extending into said housing,
  a casing having a portion connected to said housing adjacent to said tube,
  said casing having a second portion extending through said exterior wall of said housing and being sealed thereagainst, and
  a packing placed at least partly in said first portion of said casing, said tube extending through said packing,
  said casing having an opening outside of said housing and said packing and said tube being accessible from the outside through said opening and said casing.

5. In an internal combustion piston engine as defined in claim 4 and wherein the cross section of said second portion of said housing is circular.

6. In an internal combustion piston engine as defined in claim 4, a drainpipe connected to said casing for draining liquid from said casing which liquid is wiped by said packing from said tube.

7. In an internal combustion piston engine having a hollow piston and at least two tubes connected thereto parallel with the longitudinal axis of the piston for supplying a liquid coolant to the piston and removing the coolant from the piston:
  a housing for the engine, said housing having an exterior wall, said tubes extending into said housing,
  a casing having a portion connected to said housing adjacent to said tubes,
  said casing having a second portion extending through said exterior wal of said housing and being sealed thereagainst,
  at least two packings placed at least partly in said first portion of said casing, one each of said tubes extending through one each of said packings,
  said casing having an opening outside of said housing and said packings and said tubes being accessible from the outside through said opening and said casing and
  a drainpipe for each packing connected to said casing for separately draining liquids from said casing which liquids are wiped by said packings from said tubes.

8. In an internal combustion piston engine as defined in claim 7, a partition wall in said casing parallel to and between said tubes.

9. In an internal combustion piston engine having a hollow piston and at least one tube connected thereto parallel with the longitudinal axis of the piston for supplying a liquid coolant to the piston and removing the coolant from the piston:
  a housing for the engine, said housing having an exterior wall, said tube extending into said housing,
  a casing having a portion connected to said housing adjacent to said tube,
  said casing having a second portion extending through said exterior wall of said housing and being sealed thereagainst,
  a wall in said casing extending normal to the longitudinal axis of said tube and dividing the interior of said casing into two chambers, and
  packing means surrounding said tube and placed at least partly in said first portion of said casing and having two coaxial parts, one of said parts being in one of said chambers and the second part of said packing means being in the second of said chambers,
  said second portion of said casing having an opening outside of said housing and said packing parts and said tube being accessible from the outside through said opening and through said chambers.

10. In an internal combustion piston engine as defined in claim 9 a drain pipe connected to each of said chambers for separately removing liquid wiped from said tube by said packing parts.

References Cited by the Examiner

UNITED STATES PATENTS

| 1,073,197 | 9/1913 | Westinghouse | 123—41.35 |
| 2,657,678 | 11/1953 | Maybach | 123—41.36 |

FOREIGN PATENTS 337,025  4/1959  Switzerland.

KARL J. ALBRECHT, *Primary Examiner.*